UNITED STATES PATENT OFFICE.

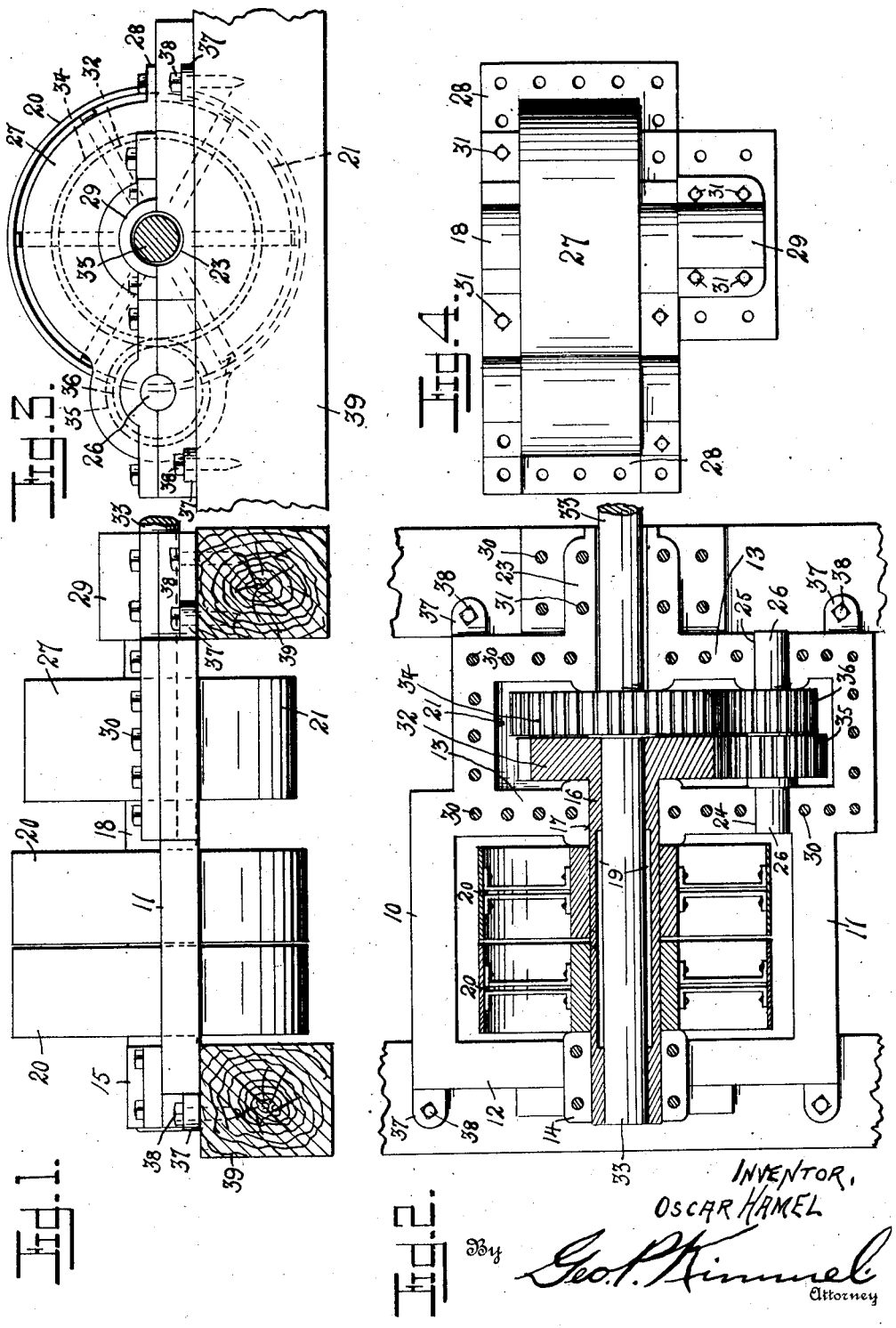

OSCAR C. HAMEL, OF PEABODY, MASSACHUSETTS.

GEARING.

1,391,542.     Specification of Letters Patent.     Patented Sept. 20, 1921.

Application filed August 4, 1920. Serial No. 401,122.

*To all whom it may concern:*

Be it known that I, OSCAR C. HAMEL, a citizen of the United States, residing at Peabody, in the county of Essex and State of Massachusetts, have invented certain new and useful Improvements in Gearing, of which the following is a specification.

This invention relates to driving gearing, and has for one of its objects to produce a device whereby the power to produce the required motion is reduced, without decreasing the efficiency of the apparatus.

Another object of the invention is to produce a device of this character in which provision is made for operating the moving parts in an inclosing oil holding casing, to prevent noise and to secure the necessary lubrication.

Another object of the invention is to provide a device of this character including a supporting frame in two portions, one portion to support a rotative means, and the other portion supporting speed controlling means together with a receptacle for a lubricant in which the speed controlling gearing constantly rotates.

With these and other objects in view, the invention consists in certain novel features of construction as hereinafter shown and described and then specifically pointed out in the claims hereunto appended, and in the drawings illustrative of the preferred embodiment of the invention.

In the accompanying drawings:

Figure 1 is a side elevation with the combined cover and cap member in position, Fig. 2 is a plan view partly in section with the combined cover for the oil chamber and shaft cap member detached, Fig. 3 is an end elevation, Fig. 4 is a plan view of the oil chamber cover and shaft caps.

The improved device comprises an oblong open frame including longitudinal members 10—11 and end members 12 and 13. The side members 10 and 11 of the frame are connected by an intermediate transverse member 13' thus dividing the frame into two portions, a relatively large and a relatively small portion as shown.

The frame member 12 is provided with a half bearing 14 and a cap 15, for one end of a tubular shaft 16, while the intermediate frame member 13' is provided with a similar half bearing 17 and cap 18 for the same tubular shaft, the tubular shaft being formed with an intermediate oil chamber or reservoir indicated at 19.

The shaft 16 supports drive pulleys 20 operating within the larger frame portion, as shown.

Formed integral with the frame member 13 and depending below the same is a half casing or pocket 21 for a lubricating element.

Extending from the outer side of the half casing 21 is a half bearing 23, and formed in the frame member 13 are half bearings 24 and 25 to support a counter shaft 26.

Bearing over the half casing 21 is the other half of the casing represented at 27, and having flanges 28 and cap 29 corresponding to and coacting with the portion of the frame members which encompass the half casing 21.

The casing member 27 is secured by bolts 30 through the flange 28 and by bolts 31 through the flanges of the half bearings 23 and 29.

The casing members 21 and 27 constitute a reservoir for lubricating oil for the gearing, and the joint between the flanges will be suitably packed to prevent the escape of the oil.

The tubular shaft 16 extends into the oil reservoir and is provided with a gear 32, preferably integral with the shaft, and operating within the reservoir.

Rotative in the tubular shaft 16, is a drive shaft 33, the latter supported at one end in the tubular shaft 16 externally of oil chamber 19, and likewise supported by the hub portion of the gear 32.

At one end the shaft 33 extends through bearing 23—29 and beyond the same and is adapted to receive a gear, belt pulley, or the like, whereby power is transmitted from or to the shaft.

Mounted on the shaft 33 within the oil reservoir or casing 21—27 is a larger gear 34, and mounted on the counter shaft 26 are pinions 35 and 36 of unequal diameter engaging respectively with the gears 32 and 34.

The flange frame members 10 and 11 are provided with supporting lugs 37 perforated to receive holding bolts 38 whereby the apparatus may be attached to a suitable support, represented conventionally at 39.

With an apparatus thus constructed it will be obvious that motion imparted to the pulleys 20 or to the shaft 33 as the case may be, will be transmitted from one to the other with materially increased or decreased torque, or increased or decreased speed. For instance, if the motion is imparted to the shaft 33, this motion will be transmitted to the pulleys 20 at somewhat increased speed, and if the motion be imparted to the pulleys 20, the motion will be transmitted to the shaft 33 and the pulley or gear connected thereto, at decreased speed but with increased torque.

The larger frame portion operates to support the pulley bearing portion of the tubular shaft, while the tubular shaft in turn supports the driver shaft 33.

The end member 12 of the frame is therefore an important feature of the apparatus and insures a uniform support for the tubular shaft and the internal shaft at their outer ends, and prevents unequal movement during the operation.

The improved device is simple in construction and can be adapted without material structural change to various kinds of machinery.

The gearing travels constantly in a bath of oil, which not only lubricates the gearing but prevents noise, so that the device operates practically noiseless.

The preferred embodiment of the invention is disclosed in the drawings and set forth in the specification, but it will be understood that any modifications within the scope of the claims may be made in the construction without departing from the principle of the invention or sacrificing any of its advantages.

What I claim is:

1. In an apparatus of the class described a supporting frame oblong in outline and including end members and an intermediate transverse member, said end members and intermediate members having shaft bearings in alinement longitudinally of the frame, an oil holding casing depending from the frame between the intermediate cross member and one of the end members, said bearings adapted to support shaft elements and gearing elements with the gearing elements operating constantly in the oil in the half casing, and drive pulleys carried by the shaft elements within the frame between the intermediate transverse member and the other end member.

2. In an apparatus of the class described a supporting frame oblong in outline and including end members and an intermediate transverse member, said end members and intermediate member having shaft bearings in alinement longitudinally of the frame, an oil holding casing depending from the frame between the intermediate cross member and one of the end members, said bearings adapted to support shaft elements and gearing elements with the gearing elements operating constantly in the oil in the half casing, drive pulleys carried by the shaft elements within the frame between the intermediate transverse member and the other end member, and a cover for the oil holding half casing attached to the frame.

In testimony whereof, I affix my signature hereto.

OSCAR C. HAMEL.